(12) United States Patent
Haeusler et al.

(10) Patent No.: US 10,871,432 B1
(45) Date of Patent: Dec. 22, 2020

(54) TUBULAR SENSORS FOR INLINE MEASUREMENT OF THE PROPERTIES OF A FLUID

(71) Applicant: RHEONICS GMBH, Winterthur (CH)

(72) Inventors: Klaus Haeusler, Zurich (CH); Joseph Goodbread, Winterthur (CH); Sunil Kumar, Winterthur (CH)

(73) Assignee: RHEONICS GMBH, Winterthur (CH)

( * ) Notice: Subject to any disclaimer, the term of this patent is extended or adjusted under 35 U.S.C. 154(b) by 208 days.

(21) Appl. No.: 15/688,789

(22) Filed: Aug. 28, 2017

Related U.S. Application Data

(60) Provisional application No. 62/379,953, filed on Aug. 26, 2016.

(51) Int. Cl.
 *G01N 11/16* (2006.01)
 *G01N 9/00* (2006.01)

(52) U.S. Cl.
 CPC .......... *G01N 11/162* (2013.01); *G01N 9/002* (2013.01)

(58) Field of Classification Search
 CPC .. G01N 9/002; G01N 2009/006; G01N 11/00; G01N 11/162
 USPC ...... 73/32 A, 32 R, 54.01, 54.24, 54.41, 650
 See application file for complete search history.

(56) References Cited

U.S. PATENT DOCUMENTS

| | | | | |
|---|---|---|---|---|
| 3,225,588 | A * | 12/1965 | Bournazel | E21B 47/10 73/32 A |
| 4,524,610 | A * | 6/1985 | Fitzgerald | G01N 11/167 73/32 A |
| 4,920,787 | A | 5/1990 | Dual et al. | |
| 5,837,885 | A | 11/1998 | Goodbread et al. | |
| 8,291,750 | B1 | 10/2012 | Goodbread et al. | |
| 8,752,416 | B2 | 6/2014 | Goodbread et al. | |
| 9,267,872 | B2 | 2/2016 | Haeusler et al. | |
| 9,518,906 | B2 | 12/2016 | Goodbread et al. | |
| 9,752,911 | B2 * | 9/2017 | Cage | G01F 1/849 |
| 2003/0233868 | A1 * | 12/2003 | Rieder | G01N 11/167 73/54.41 |
| 2013/0139576 | A1 | 6/2013 | Goodbread et al. | |

(Continued)

FOREIGN PATENT DOCUMENTS

| | | |
|---|---|---|
| EP | 2614353 | 7/2013 |
| JP | 5888330 B2 | 3/2016 |

(Continued)

*Primary Examiner* — Benjamin R Schmitt

(74) *Attorney, Agent, or Firm* — Timothy E. Siegel Patent Law, LLC; Timothy E. Siegel

(57) ABSTRACT

An inline fluid properties measurement device that includes a tube defining an interior space that includes at least one non-cylindrical volume, and having a fluid entrance and exit, and capable of conducting fluid from the fluid entrance to the fluid exit, through the at least one non-cylindrical volume. An excitation and sensing transducer assembly is positioned to torsionally drive the tube and to sense torsional movement of the tube and a controller is programmed to drive the excitation and sensing transducer to drive the tube in torsion, thereby translating the fluid in the at least one non-cylindrical volume, and to sense torsional movement of the tube, thereby producing a sense signal. Finally, a signal analysis assembly responsive to the sense signal to form a measurement of at least one property of the fluid.

23 Claims, 9 Drawing Sheets

(56) References Cited

U.S. PATENT DOCUMENTS

| | | | |
|---|---|---|---|
| 2013/0141262 A1* | 6/2013 | Hays | G01F 1/8431 341/118 |
| 2015/0082873 A1 | 3/2015 | Goodbread | |
| 2016/0011012 A1 | 1/2016 | Goodbread | |

FOREIGN PATENT DOCUMENTS

| | | |
|---|---|---|
| WO | 2012012508 A2 | 1/2012 |
| WO | 2012033772 A2 | 3/2012 |
| WO | 2014066433 | 5/2014 |
| WO | 2016166610 A2 | 10/2016 |
| WO | 2016168842 A1 | 10/2016 |

\* cited by examiner

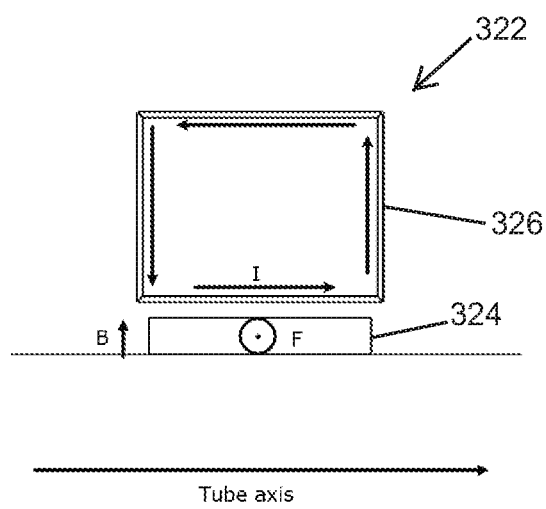
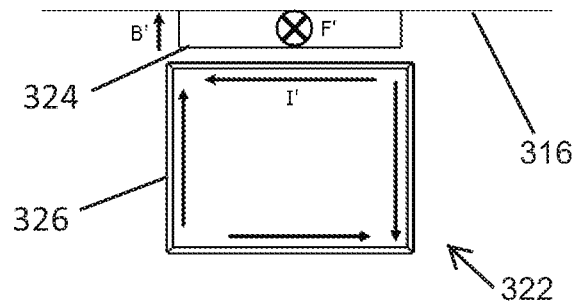
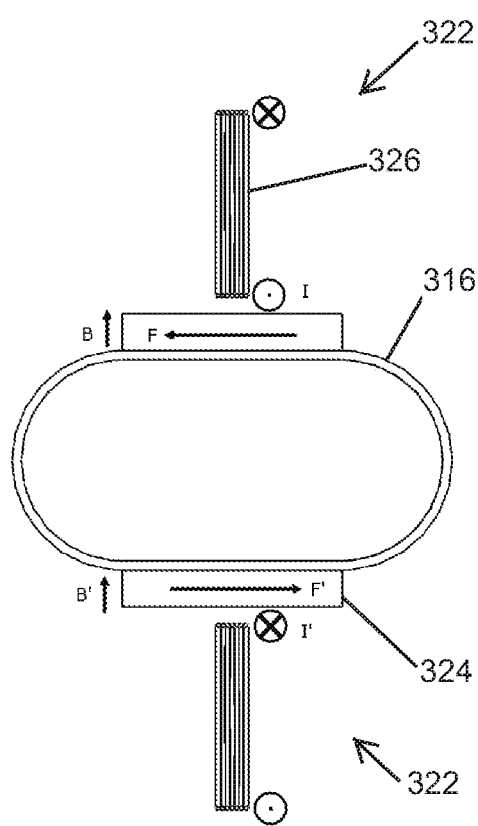
FIG. 5A
FIG. 5B

TUBULAR SENSORS FOR INLINE MEASUREMENT OF THE PROPERTIES OF A FLUID

RELATED APPLICATIONS

This application claims benefit of provisional application Ser. No. 62/379,953, filed on Aug. 26, 2016, which is incorporated by reference as if fully set forth herein.

BACKGROUND

Sensors for measuring the properties of a fluid in a manufacturing process are known. However, sensors that are placed in pipes carrying process fluids are particularly advantageous because they measure the relevant fluid properties—for example viscosity and density—at the point of application, and so better represent these properties at the point of application. Online measurements permit rapid adjustment of process parameters, enabling the operator to maintain process tolerances with minimal waste of material.

Among inline sensors, those that produce minimal obstruction to the flowing medium are particularly advantageous, from the standpoint of cleanability, and reduced tendency to trap particulate components of the fluid medium that could cause a blockage and also influence the operation of the sensor. Tubular sensors offer particular advantages in this respect, since they can be placed in series with process piping, without the need of bypass lines or special measurement chambers that introduce unwanted obstructions into the process line.

Inline tubular sensors are well known, of which Coriolis mass flow meters are perhaps the most widely employed. Coriolis meters use vibrating tubes to measure both mass flow and density. Of known Coriolis meters, a species thereof uses a straight tube vibrating transversely to make the desired measurements. Of straight-tube Coriolis meters, there are known methods for extracting information about the viscosity of the flowing medium, although this is generally considered a secondary measurement.

It is widely known that transverse vibrations in a straight tube are difficult to isolate from the means used to mount the tube in its supporting structure. Such supporting structures must be sufficiently rigid and massive such that the vibrations of the tube are not influenced by forces incurred from installing the sensor in the process pipeline. In the case of viscosity measurement, where it is necessary to measure the mechanical damping of the tubular resonator, any loss of energy through the mounting structure has a negative impact on the measurement of the viscosity of the fluid contained therein.

It is known that resonators vibrating torsionally are easier to decouple from their mounting structures because of the absence of the bending forces exerted on such structures by transversely vibrating resonators. Tubular resonators for measuring fluid properties are disclosed in U.S. Pat. Nos. 4,920,787 and 6,112,581. U.S. Pat. No. 6,112,581, in particular, uses a torsionally vibrating tube to measure viscosity, but is also vibrated transversely to measure density, which carries with it the disadvantages described above of transversely vibrating resonators.

SUMMARY

The present invention consists of a method for measuring fluid properties using a tubular resonator vibrating in torsion, which measures density and viscosity of a fluid contained within it, while providing minimal obstruction to the flow of the fluid. Although the method is described as measuring density and viscosity, it is also capable of measuring other fluid properties, such as flow rate, corrosion effects and tendency of the fluid to deposit materials on solid structures with which they are in contact. The invention therefore has additional applications in monitoring deposition of, for example, scale, hydrates, waxes, and asphaltenes in petroleum flow assurance applications. It is also applicable to measurement of corrosion in pipelines and other fluid conduits subject to corrosion by the media they conduct.

The present invention also encompasses a device to perform the method, the device also encompassing a number of species with related approaches to extending the measurement range and field of application of the device.

BRIEF DESCRIPTION OF THE DRAWINGS

FIG. 5A is a sectional view of the excitation and sensing transducer of FIG. 4, taken along line 5A-5A of FIG. 4, but with other elements of the resonator of FIG. 4 removed, for clarity of presentation.

FIG. 5B is a sectional view of the resonator of FIG. 4, taken along a view line horizontally orthogonal to line 5A-5A of FIG. 4.

DETAILED DESCRIPTION

Definition: In the context of this application, a cylindrical volume is round in cross-section.

In broad overview, this application discloses several structures for tubular resonators that produce motion of the tube contents perpendicular to the surface of the tube when the tube is driven torsionally, to permit separation of the effects of fluid density and viscosity. In this way, the advantages of a purely torsional resonator can be gained while simultaneously providing an inline sensor that is sensitive to at least density and viscosity of the contained fluid.

Figure 1A:
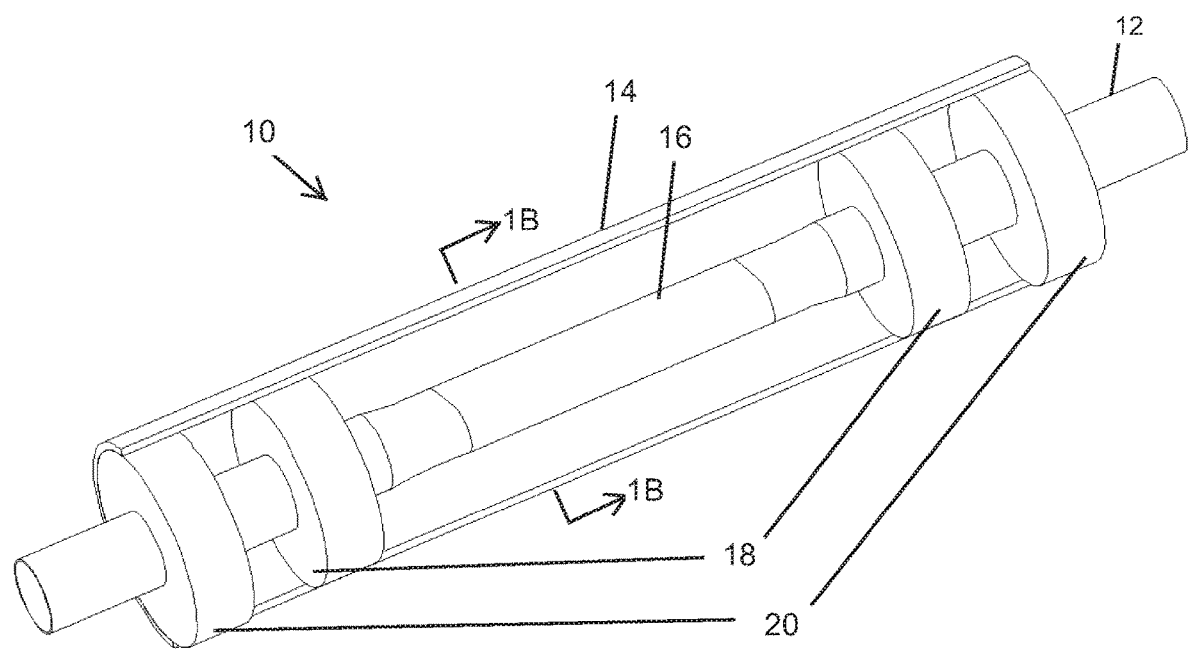
FIG. 1A is an isometric sectional view of a sensor, according to the present invention.
Figure 1B:
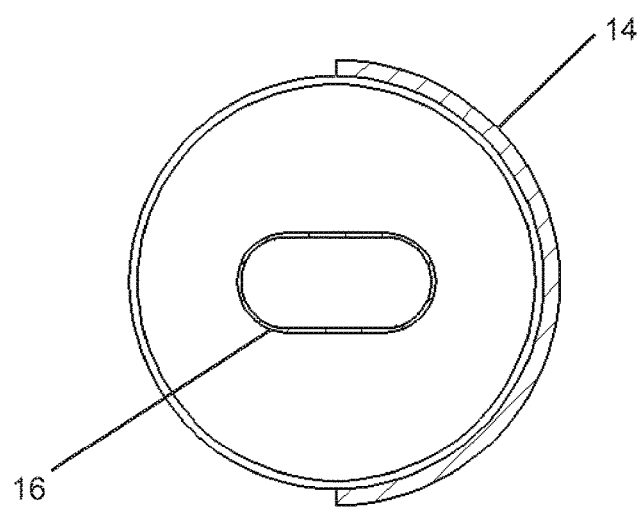
FIG. 1B is a sectional view of the resonator of FIG. 1, taken along line 1B-1B of FIG. 1A, with a portion of the outer casing not shown.

Referring to FIGS. 1A and 1B, an Inline resonator 10 consists of a tubular structure 12 mounted in a supporting casing 14 (a portion of the outer portion of casing 14 is not shown, in fact it goes all the way around), with the central section 16 of the tubular structure 12 being flattened in such a manner as to provide a noncylindrical, generally rectangular flow channel 16 with two arcuate sides (as shown in FIG. 1B.

Resonator 10 includes an excitation and sensing transducer assembly (see FIG. 4) for both exciting and sensing torsional vibrations of the tubular structure around its central lengthwise axis. Types of transducers include, but are not limited to, electromagnetic transducers and piezoelectric transducers and other combinations, for example an electromagnetic excitation transducer with an optical pickup.

The resonant vibrations of the tubular torsionally resonant structure 12 are modified by the fluid contained within it in two principal ways. As the tube vibrates torsionally, it shears the fluid in a thin boundary layer close to the wall of the tube 12. The shear stresses produced by this shearing motion are proportional to the viscosity of the fluid and therefore extract energy from the vibrating tube at a rate dependent on the fluid's viscosity.

Furthermore, because the cross-section of tube 12 is flattened, torsional motion about the lengthwise axis produces a motion of the wall perpendicular to its own interior surface, causing apparent additional fluid mass to vibrate along with the tube 12, the additional fluid mass being proportional to the fluid's density. The additional mass-loading, combined with the rotational inertia of the tube's vibrating section, decreases the torsional resonant frequency of the tubular resonator, in proportion to the density of the fluid.

In addition to providing means to shear and displace fluid within the resonant structure, resonator 10 includes inertial masses 18, typically in the form of disks, and mounting fixtures 20, also typically in the form of disks, affixed to the interior of casing 14 (FIG. 1), which act to vibrationally isolate the resonator 10 from its environment, thereby minimizing the effects of mounting forces on the resonant properties of the resonator 10. Inertial masses 18 are smaller in diameter than the mounting fixtures 20 so as not to contact the casing 14. The inertial masses 18 create well defined nodes on the flow tube 12, minimizing the torsional displacement of the tube 12 on the section of the tube 12 between the mounting fixtures 20 and the inertial masses 18, resulting in a decoupling of the torsional vibrations of the flow tube 12 from said mounting fixtures 20.

Two further species of resonators meeting the criteria of both shearing and displacing fluid during torsional motion are disclosed as embodiments of this method. It should be understood that these are merely exemplary of possible further embodiments.

Figure 2A:
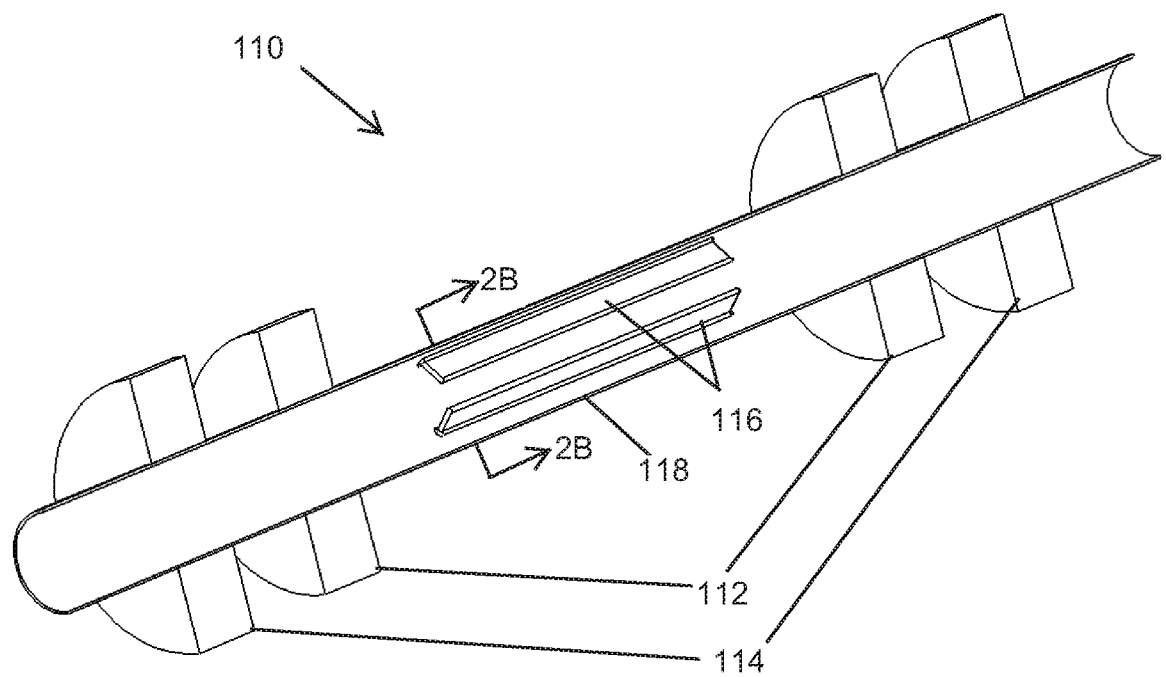
FIG. 2A is an isometric sectional view of an alternative embodiment of a resonator, according to the present invention.
Figure 2B:
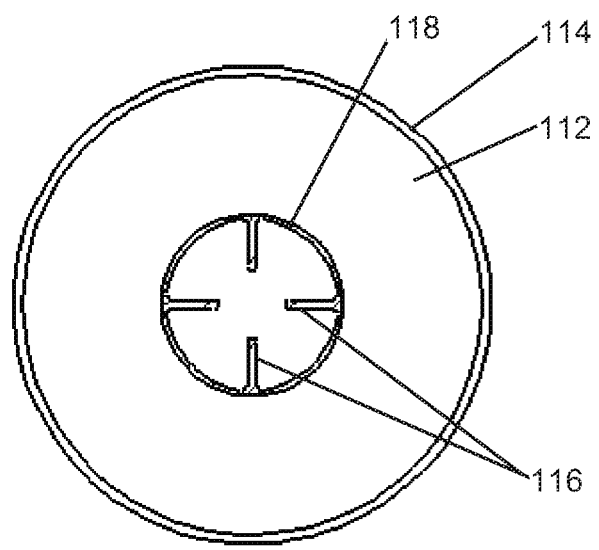
FIG. 2B is a sectional view of the resonator of FIG. 2A, taken along line 2B-2B of FIG. 2A.

Referring to FIGS. 2A and 2B, a second method utilizes a cylindrical tubular resonator 110, equipped with inertial masses 112 and mounting fixtures 114, and also provided with fins 116 attached to the inner surface of the tube 118 and projecting substantially radially inwardly toward the rotational axis of the tube 118. The fins 116 impart perpendicular motion to the contents of tube 118 necessary to produce mass loading by the fluid which modifies the resonant frequency proportionally to the fluid density. FIG. 2A shows an embodiment with four such fins 116, although it is understood that any radially symmetric arrangement would serve an identical function. FIG. 2B shows a cross section through the central part of the tube 118 showing the substantially radial disposition of the fins 116.

Radially symmetric fin patterns are used to avoid applying unbalanced transverse forces on the contents of tube 118 that could excite unwanted transverse vibrations. This precludes the use of a single radial fin 116, although such radially asymmetric fin patterns could be used if such modes were desired.

Figure 3A:
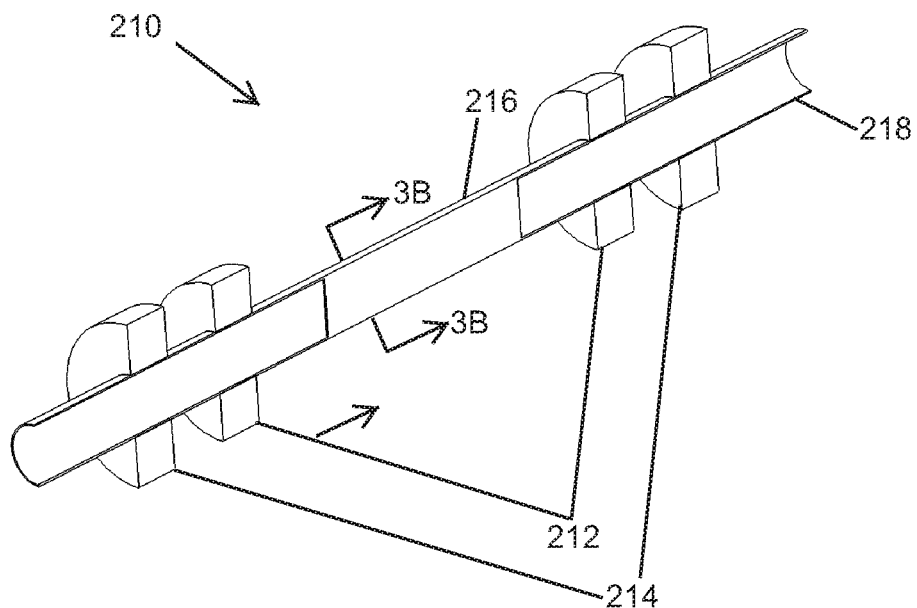
FIG. 3A is an isometric sectional view of another alternative embodiment of a resonator, according to the present invention.
Figure 3B:
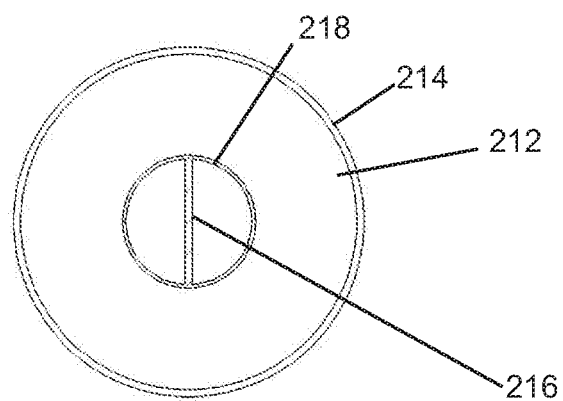
FIG. 3B is a sectional view of the resonator of FIG. 3A, taken along line 3B-3B of FIG. 3A.

A third embodiment 210 of the resonator, also fitted with inertial masses 212 and mounting fixtures 214, extends at least two of the radial vanes to create a longitudinal wall or partition 216 through at least a portion of the tube 218, as shown in FIGS. 3A and 3B. FIG. 3A shows a longitudinal section through a tube 218 with a single longitudinal partition 216, while FIG. 3B shows a cross sectional view through the center of the longitudinally partitioned tube 210.

Figure 4:
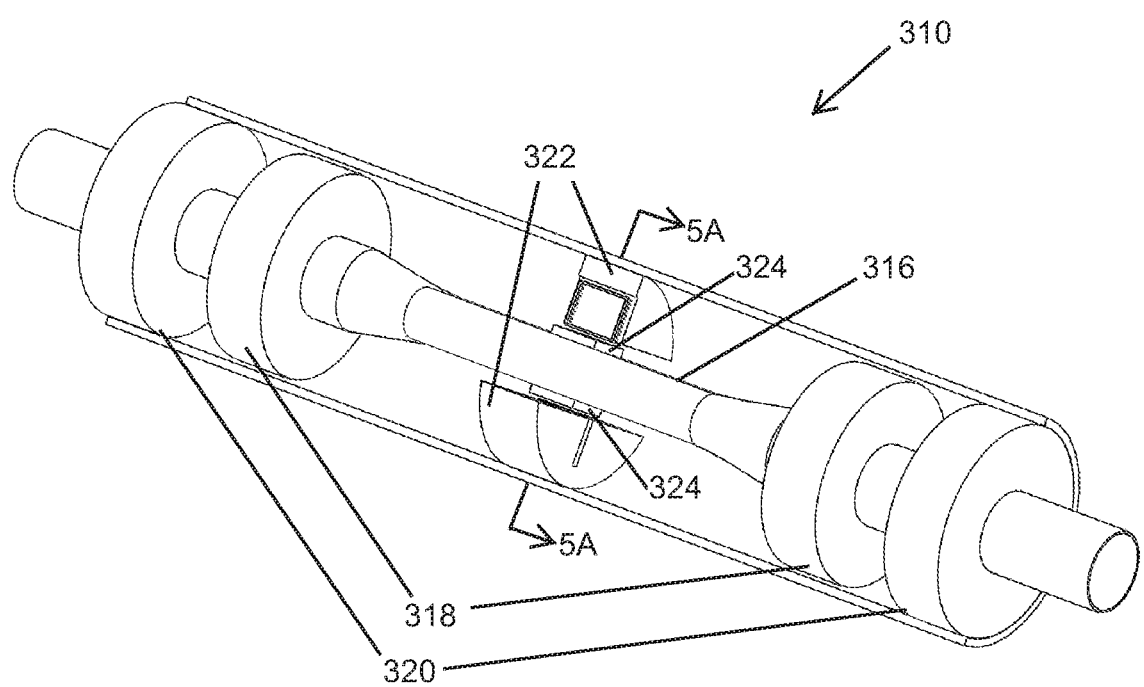
FIG. 4 is an isometric sectional view of the resonator of FIG. 1A, showing further elements of a working resonator.

As shown in FIG. 4, the transducers consist of two magnet-coil assemblies 322 symmetrically disposed around the lengthwise plane parallel to the flattened tube surfaces 316, and corresponding permanent magnets 324 fixed to surfaces 316. In one embodiment, a first one of the transducers 322 may be used for excitation and a second one of the transducers 322 may be used for sensing. In an alternative preferred embodiment, both transducers 322 may be used for both sensing and excitation by alternately switching the coils between the excitation and the sensing circuit (not shown), as disclosed in U.S. Pat. Nos. 8,291,750 and 8,752,416. This is possible under the condition that the resonator 310 is always operated in such a manner that the vibration induced by the excitation persists long enough after cessation of the excitation signal to permit evaluation of the persistent signal for estimation of the fluid properties of interest.

The transducer arrangement shown in FIG. 4 is one of many possible transducer arrangements, but is shown here as being particularly suitable for exciting and sensing torsional vibrations in the embodiments shown in this application. The operating principle is explained with the help of FIG. 5A, in which the magnets 324 and coils 326 are shown isolated from the resonator 310 and supporting structures, for clarity of presentation.

The two coils 326, disposed on either side of the lengthwise plane, carry currents I and I' in opposite directions. The fields of the two magnets 324 bonded to the flattened tube 316 surface are parallel to one another. The resultant Lorentz forces, F and F', produce matching torsional forces on the tube, as shown in FIG. 5B, causing rotation. Conversely, a torsional motion of the flattened tube 316, moves magnets 324, thereby inducing currents in the two coils 326 proportional to the angular velocity of the tube 316 about its longitudinal axis.

Figure 6:
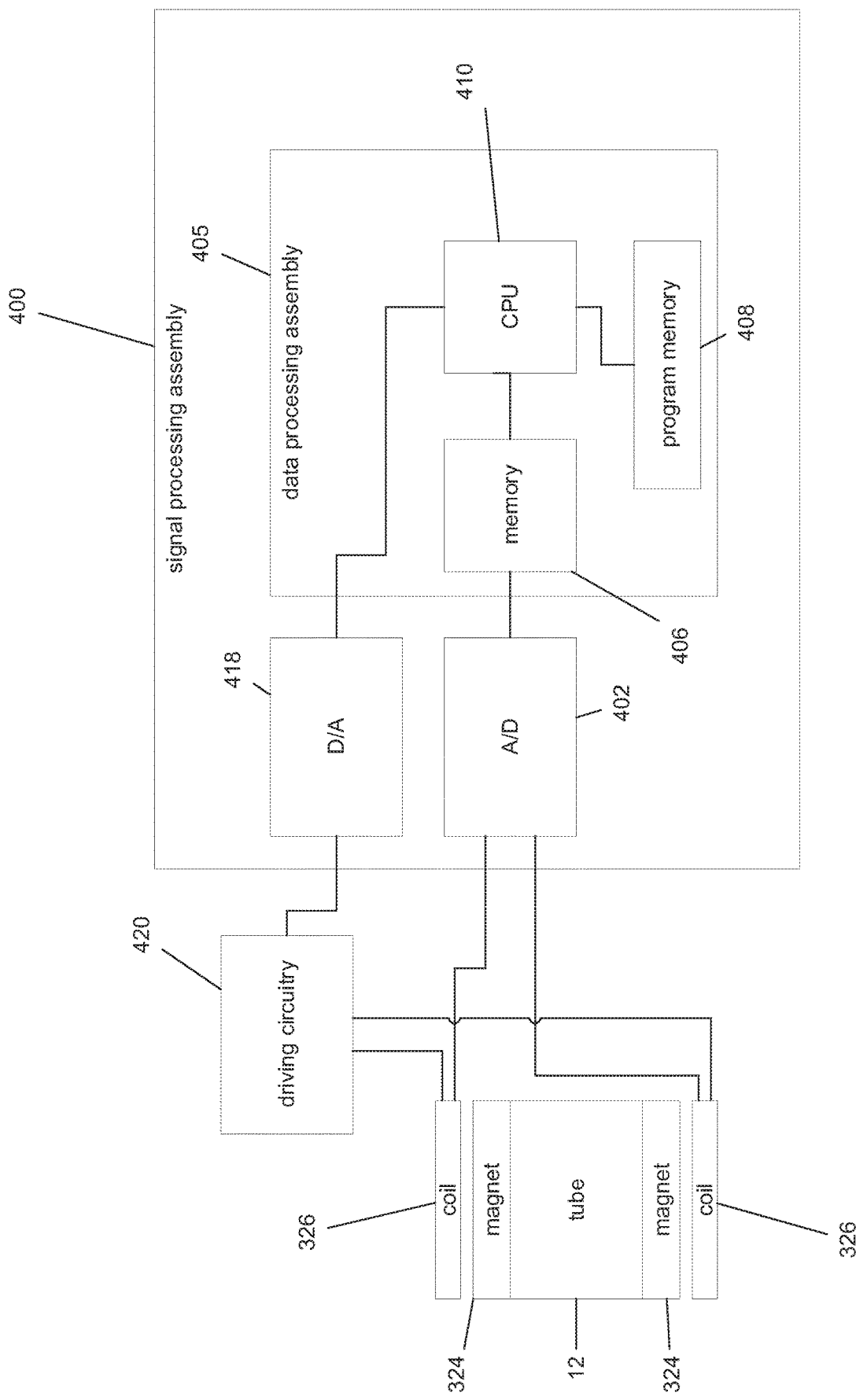
FIG. 6 is a block diagram of an embodiment of a fluid sensor according to the present invention.

Referring, now, to FIG. 6, in a preferred embodiment, current from coils 326 caused by movement of magnets 324 drives an analog-to-digital convertor circuit (A/D) 402, at the input of a signal processing assembly 400. The output of A/D 402 is fed into a memory 406, that is at the input of a data processing assembly 405, and analyzed by a CPU 410 that operates in accordance with a computer program stored in a non-transitory program memory 408. One output from the CPU 410 drives a digital-to-analog convertor circuit (D/A) 418 which drives driving circuitry 420, which amplifies the signal, and which drives coils 326. In an alternative embodiment, a first coil 326 drives the A/D convertor 402 and a second coil 326 is driven by the D/A convertor 418 and in turn drives facing magnet 324. The CPU 410 could also be termed a controller and is part of the signal processing assembly 400.

Figure 7:
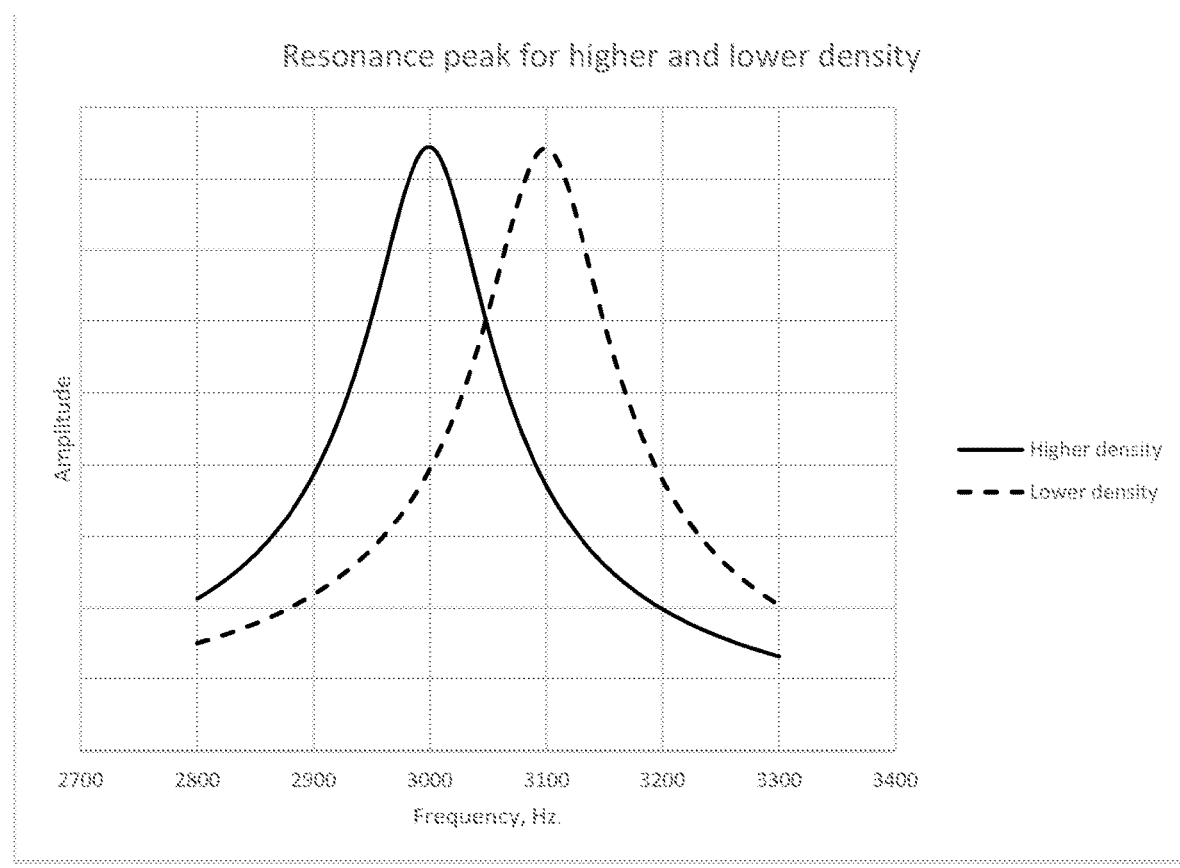
FIG. 7 is a graph showing resonance amplitude as a function of frequency, for both a high density and a low-density liquid with similar viscosities
Figure 8:
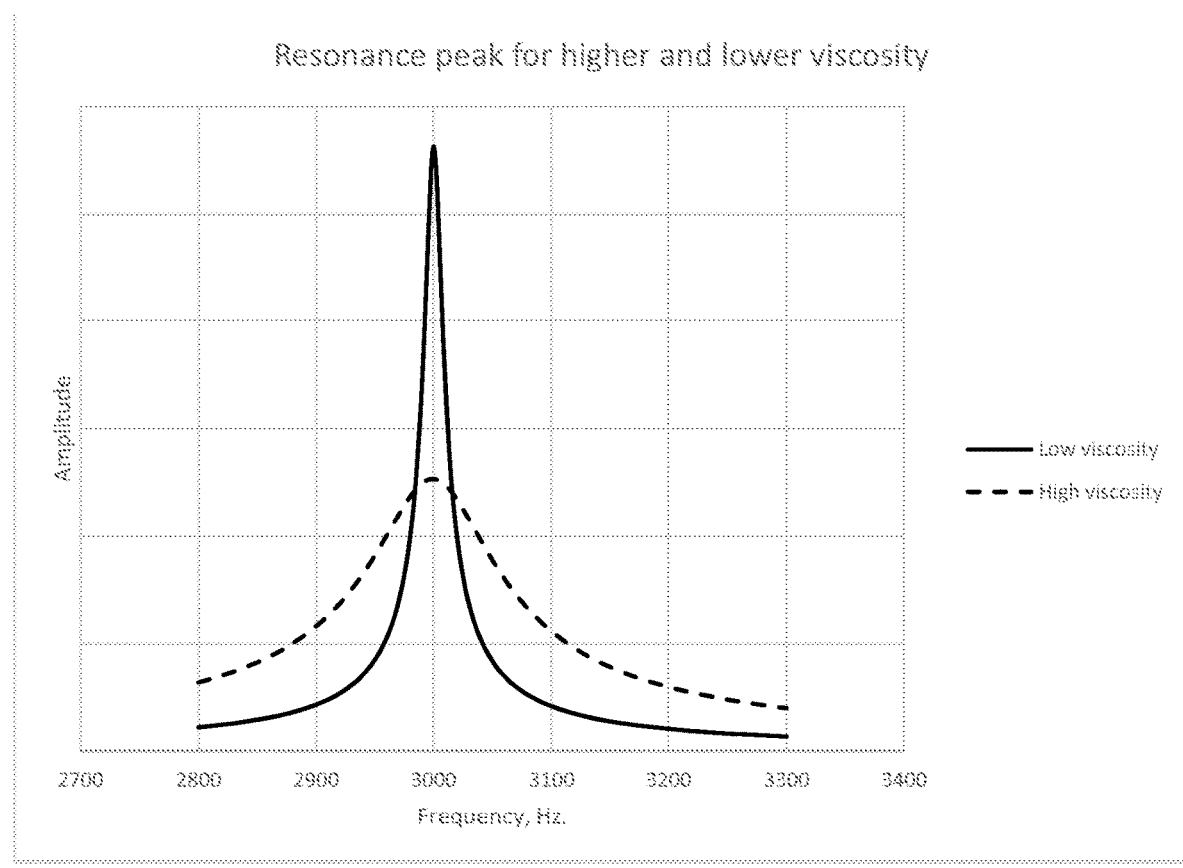
FIG. 8 is a graph showing resonance amplitude as a function of frequency, for both a high viscosity and a low viscosity liquid with similar densities
Figure 9:
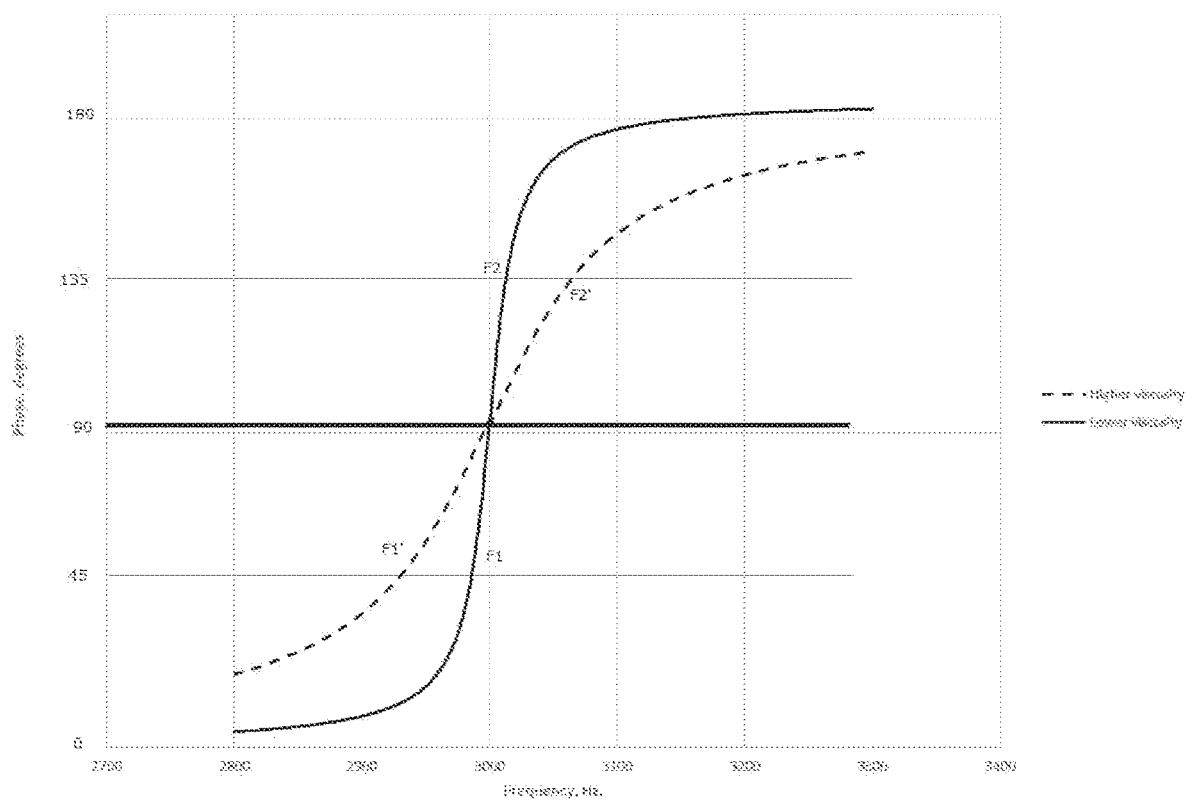
FIG. 9 is a graph showing phase delay between a sinusoidal excitation and a resonant response, as a function of frequency, for both a high viscosity and a low viscosity liquid.

Referring to FIGS. 7, 8 and 9, the resonant properties of a resonator that interacts with a fluid such that it both shears and displaces the fluid are influenced by the resistance of the fluid to the shear and displacement. Fluid properties can be measured by varying the frequency at which the resonator is excited by the transducer and measuring the effect on phase delay and peak resonance. The frequency response of the resonator is influenced by mass loading in that its resonant frequency is lowered as the mass loading by the fluid increases. The displacement of the resonant peak is therefore a measure for the density of the fluid, the resonant peak displacement being roughly linear with the density of the fluid. This is shown by the resonance diagrams in FIG. 7.

Increasing viscosity of the fluid lowers and broadens the resonant peak, the broadening and lowering being roughly proportional to the square root of the product of the fluid's viscosity and density. The broadening and lowering of the peak are shown in FIG. 8.

Electronic means for measuring the damping and resonant frequency are known. A method that is particularly suited to the measurement of the resonant properties is disclosed, for example, in U.S. Pat. No. 8,291,750. In that method, a gated excitation signal excites the resonator at several phase values around its resonant frequency, and a gated phase locked loop measures the frequencies at which the phase values occur. From the frequencies and the phase values, the resonant frequency and width of the resonant peak may be calculated, from which calculated values a viscosity and a density may be derived.

The operation of this phase locked loop is shown in FIG. 9. The two lines at phases of 45° and 135° intersect the phase response curves at frequencies F1 and F2 for the lower viscosity fluid, and at F1' and F2' for the higher viscosity fluid. The phase locked loop alternately locks the resonator to, for example, 45° and 135° and measures the resulting frequency difference for the two-phase angles. The frequency difference F2–F1 is smaller than the frequency difference F2'–F1', being approximately proportional to the square root of the product of density and viscosity of the fluid.

Similarly, the value of the resonant frequency, for which the phase angle is 90°, can be determined by setting the phase locked loop to 90°, and measuring its resultant frequency, the frequency being a measure for the density of the fluid. From these two measurements, F (90°) and F2–F1, both the density-viscosity product and the density may be calculated, from which two quantities the dynamic viscosity can also be calculated. Furthermore, the density and dynamic viscosity may be used to calculate kinematic viscosity.

The invention claimed is:

1. An inline fluid properties measurement device, comprising:
    (a) a tube, having an exterior surface that is mounted in and to a supportive casing, and defining an interior space that includes at least one non-circularly cylindrical volume, and having a fluid entrance and exit that extends further than said casing, thereby providing a free end for a pipe to be attached on either end to said tube, so that all of the liquid flowing through said pipe flows through said tube, and capable of conducting fluid from said fluid entrance to said fluid exit, through said at least one non-circularly cylindrical volume;
    (b) an excitation and sensing transducer assembly positioned to torsionally drive said tube and to sense torsional movement of said tube
    (c) a controller programmed to drive said excitation and sensing transducer to drive said tube in torsion, thereby translating said fluid in said at least one non-circularly cylindrical volume, and to sense torsional movement of said tube, thereby producing a sense signal;
    (d) a signal analysis assembly responsive to said sense signal to form a measurement of at least one property of said fluid;
    (e) wherein said excitation and sensing transducer includes an electromagnet assembly and an attached magnet assembly, attached directly to said exterior surface of said tube and responsive to said electromagnet assembly to place a torqueing force on said tube, and wherein said electromagnet assembly also senses movement of said attached magnet assembly, said electromagnetic assembly being longitudinally coincident to said attached magnet assembly, there further being no driving and sensing assembly to drive said tube other than in torsion; and
    (f) whereby said tube can be mounted in and form a part of a fluid pathway.

2. The inline fluid properties measurement device of claim 1, wherein at least a portion of said tube is non-circularly cylindrical, thereby defining a single non-circularly cylindrical interior volume.

3. The inline fluid properties measurement device of claim 1, wherein said tube includes inwardly extending fins, thereby dividing said interior space into multiple non-circularly cylindrical volumes.

4. The inline fluid properties measurement device of claim 1, wherein said tube includes at least one longitudinal partition, thereby dividing said interior space into at least two separate non-circularly cylindrical volumes.

5. The inline fluid properties measurement device of claim 1, wherein said signal analysis assembly includes an analog to digital convertor and a data processing assembly.

6. The inline fluid properties measurement device of claim 1, wherein said one property of said fluid is fluid density.

7. The inline fluid properties measurement device of claim 6, further measuring viscosity.

8. The inline fluid properties measurement device of claim 1, further measuring a second fluid property.

9. The inline fluid properties measurement device of claim 1, wherein said electromagnetic assembly includes a first electromagnet on a first side of said tube and a second electromagnet on a second side of said tube, opposed to said first side of said tube, and wherein said attached magnet assembly includes a first magnet opposed to said first electromagnet and a second magnet opposed to said second electromagnet.

10. The inline fluid properties measurement device of claim 9, wherein said attached magnets are permanent magnets.

11. The inline fluid properties measurement device of claim 9, wherein said first electromagnet drives said first attached magnet and said second electromagnet senses said second attached magnet.

12. The inline fluid properties measurement device of claim 9, wherein said first and second electromagnets simultaneously drive said permanent magnets, and repeatedly stop driving said permanent magnets and sense movement of said permanent magnets, by producing current in proportion to said movement.

13. The inline fluid properties measurement device of claim 1, further including a pair of mounting fixtures, mounting said tube in said casing and a pair of inertial masses, inward of said mounting fixtures, mounted to said tube and not touching said casing.

14. The inline fluid properties measurement device of claim 13, wherein said inertial masses and said mounting fixtures are in the form of disks.

15. A method for measuring properties of a fluid, comprising:
(a) providing an inline fluid properties measurement device, comprising:
  (i) a tube having an exterior surface that is mounted in and to a casing, and that defines an interior space that includes at least one non-circularly cylindrical volume, and that has a fluid entrance and exit and is mounted into a fluid pathway, so that all of said fluid flowing through said fluid pathway flows through said tube;
  (ii) an excitation and sensing transducer assembly positioned to torsionally drive said tube and to sense torsional movement of said tube;
(b) driving said excitation and sensing transducer assembly to drive said tube in torsion, thereby translating and shearing said fluid in said at least one non-circularly cylindrical volume and using said excitation and sensing transducer assembly to sense movement of said tube;
(c) wherein said excitation and sensing transducer includes an electromagnet assembly and an attached magnet assembly, attached directly to said exterior of said tube and responsive to said electromagnet assembly to apply a torqueing force to said tube, and wherein said electromagnet assembly also senses movement of said attached magnet assembly, said electromagnetic assembly being longitudinally coincident to said attached magnet assembly, there further being no driving and sensing assembly to drive said tube other than in torsion; and
(d) analyzing said sense signals to measure at least two fluid properties of said fluid in said tube.

16. The method of claim 15, wherein at least a portion of said tube is non-circularly cylindrical, thereby defining a single non-circularly cylindrical interior volume.

17. The method of claim 15, wherein said tube includes inwardly extending fins, thereby dividing said interior space into multiple non-circularly cylindrical volumes.

18. The method of claim 15, wherein said tube includes at least one longitudinal partition, thereby dividing said interior space into at least two separate non-circularly cylindrical volumes.

19. The method of claim 15, wherein said two fluid properties are fluid density and viscosity.

20. The method of claim 15, wherein said electromagnet assembly includes a first electromagnet on a first side of said tube and a second electromagnet on a second side of said tube, opposed to said first side of said tube, and wherein said attached magnet assembly includes a first magnet opposed to said first electromagnet and a second magnet opposed to said second electromagnet.

21. The method of claim 20, wherein attached magnets are permanent magnets.

22. The method of claim 20, wherein said first electromagnet drives said first attached magnet and said second electromagnet senses said second attached magnet.

23. The method of claim 20, wherein said first and second electromagnets simultaneously drive said permanent magnets, and repeatedly stop driving said permanent magnets and sense movement of said permanent magnets, by producing current in proportion to said movement.

* * * * *